United States Patent [19]

Togawa et al.

[11] Patent Number: 5,699,242
[45] Date of Patent: Dec. 16, 1997

[54] CONTROL SYSTEM FOR PRODUCTION FACILITIES

[75] Inventors: Zenta Togawa; Hiroki Morio, both of Hiroshima, Japan

[73] Assignee: Mazda Motor Corporation, Hiroshima, Japan

[21] Appl. No.: 413,865

[22] Filed: Mar. 29, 1995

[30] Foreign Application Priority Data

Mar. 29, 1994 [JP] Japan ................... 6-083948

[51] Int. Cl.$^6$ .................................... G05B 15/00
[52] U.S. Cl. ........................ 364/134; 364/468.02
[58] Field of Search ..................... 364/468, 134, 364/132, 478, 468.01–468.28, 478.01–478.18

[56] References Cited

U.S. PATENT DOCUMENTS

| | | | |
|---|---|---|---|
| 5,088,045 | 2/1992 | Shimanaka et al. | 364/468 |
| 5,150,288 | 9/1992 | Imai et al. | 364/132 |
| 5,202,836 | 4/1993 | Iida et al. | 364/468 |
| 5,231,585 | 7/1993 | Kobayashi et al. | 364/468 |
| 5,321,619 | 6/1994 | Matsuda et al. | 364/468 |
| 5,347,463 | 9/1994 | Nakamura et al. | 364/478 |

FOREIGN PATENT DOCUMENTS 2-28806  1/1990  Japan.

*Primary Examiner*—Reba I. Elmore
*Assistant Examiner*—Steven R. Garland

[57] ABSTRACT

A control system for controlling a plurality of automatic working apparatuses for performing different types of specified operations, respectively, so as to produce different types of, but functionally the same, work units for different types of products has a first data memory, provided for each of the working apparatuses, which controls each working apparatus independently from the other so as to perform a specified operation and a second data memory sharing a common memory area of the first data memory which stores operation data indicating types of operations of the respective working apparatuses and governs the first data memories so as to transfer the operation data to the first data memories therefrom all at once, whereby causing the working apparatuses to perform the different types of specified operations so as to complete a work unit.

5 Claims, 13 Drawing Sheets

CONTROL SYSTEM FOR PRODUCTION FACILITIES

BACKGROUND OF THE INVENTION

1. Field of the Invention

The present invention relates to a production facility control system, and, more particularly, to a control system for controlling production facilities for machining and assembling functionally the same type of work units adaptable to different models of products, such as vehicles, in a production line in which work units or parts of the product are transported by a transportation line for machining and assembling at various work stations.

2. Description of Related Art

In the course of increasing automation and productivity in automobile production factories or plants, it has been generalized to produce functionally same component units or assemblies for different models of vehicles by utilizing the same production line including various work stations in common. In such a production plant, a central control device, such as a host computer, provides for line control devices basic instructions including information on at least models of vehicles to be assembled in various assembling work shops and on assembling schedules, such as dates and times of assembling, for the respective vehicle models so that component units and/or assemblies are produced in the respective production lines and delivered to the assembling work shops in time for the assembling schedules.

Such a production line where component units or assemblies are produced includes a work unit transportation line along which a plurality of automatic working apparatuses, such as machining apparatuses and assembling apparatuses, are installed at the work stations, respectively. Each of these automatic working apparatuses is controlled in operation by means of an individual, terminal control device exclusive thereto. A plurality of these individual, terminal control devices are governed by a line control device which receives the basic instructions from a central control device through a primary line control device dominant over the line control device. The line control device prepares data on operation codes indicating types of operations to be performed at the respective work stations according to the basic instructions and transmits individually the operation code data to the terminal control devices so that the terminal control devices control independently the respective automatic working apparatuses to perform specified operations instructed by the operation codes, respectively. A component work unit is subjected to these specified operations in order and automatically completed.

One such automobile production control system is that disclosed in Japanese Laid-Open Patent No. 2-28806. The system is organized by a host computer, a plurality of line computers governed by the host computer, a plurality of terminal or line side computers for controlling a plurality of working apparatuses, and a plurality of control boards for controlling a plurality of production lines so that the host computer manages data on production common to the production lines as unified or consolidated data and removes and/or changes the unified data according to changes in operations of the working apparatuses.

While the system as described in Japanese Laid-Open Patent No. 2-28806 has various advantages over the prior art, nevertheless, the line control device must be subjected to high load of reading out data and transmitting the data to the terminal control devices. In addition, since, whenever the production line recovers from an accidental standstill, the line control device must read out data and transmit the data to the terminal control devices, the production line takes a long time in resuming.

SUMMARY OF THE INVENTION

It is an object of the present invention to provide a production line control system including a plurality of terminal control devices for controlling working apparatuses of the production line, respectively, and a line control device for governing the terminal control devices.

It is another object of the present invention to provide a production line control system which enables efficient data transmission from a line control device to a plurality of individual terminal control devices and provides a decrease in time necessary for a resumption of the production line after a standstill.

The above objects of the present invention are achieved by providing a control system for controlling a production facility, which includes a plurality of working apparatuses installed in work stations arranged one after another, to automatically machine and assemble work units, whereby completing the work units. The control system comprises a plurality of terminal control devices for controlling the respective working apparatuses independently from one another to perform their specified operations so as to complete a plurality of types, but functionally the same, work units one after another, and a line control device for governing the terminal control devices to cause the working apparatuses to perform their specified operations necessary to complete the different types of work units. Each terminal control device is organized at least by a data memory having a common memory area, shared in common by other terminal control devices, and an individual memory area exclusive thereto. The line control device has at least a data memory sharing the common memory area for storage of operation code data indicating at least types of specified operations performed by the working apparatuses, respectively, and is configured so as to transfer the operation code data to the data memories of the respective terminal control devices from its data memory all at once. The line control device may receive data on types and order of assembling or completing products from a primary control device dominant over the line control device and prepare the operation code data based on the data of types and order.

Each terminal control device reads out the operation code data, peculiar to each automatic working apparatus in association therewith, from the common memory area and transfers the data to the individual memory area. Further, the line control device may be loaded with data files containing operation code tables for various types of work units, respectively.

With the production facility control system according to the present invention, because the line control device transfers operation code data to the individual terminal control devices all at once, it considerably decreases its own load of data transfer. Furthermore, because the transfer of the operation code data, if necessary such as when the production line must be resumed after a recovery from standstill, is completed in a considerably short time, a decrease in time necessary for the resumption of the production line is yielded. Because the operation data including at least operation codes are prepared for various models of completed products in order of assembling, the operation data are common to the respective working apparatuses in the production line. These operation data are stored in the common memory area of the memory of the line control device and transferred to the common memory area shared by the respective terminal control devices, the preparation and transfer of operation data is simplified.

BRIEF DESCRIPTION OF THE DRAWINGS

The above and other objects and features of the present invention will be clearly understood from the following description with respect to a preferred embodiment thereof when considered in conjunction with the accompanying drawings, in which.

DETAILED DESCRIPTION OF THE PREFERRED EMBODIMENTS

Figure 1:
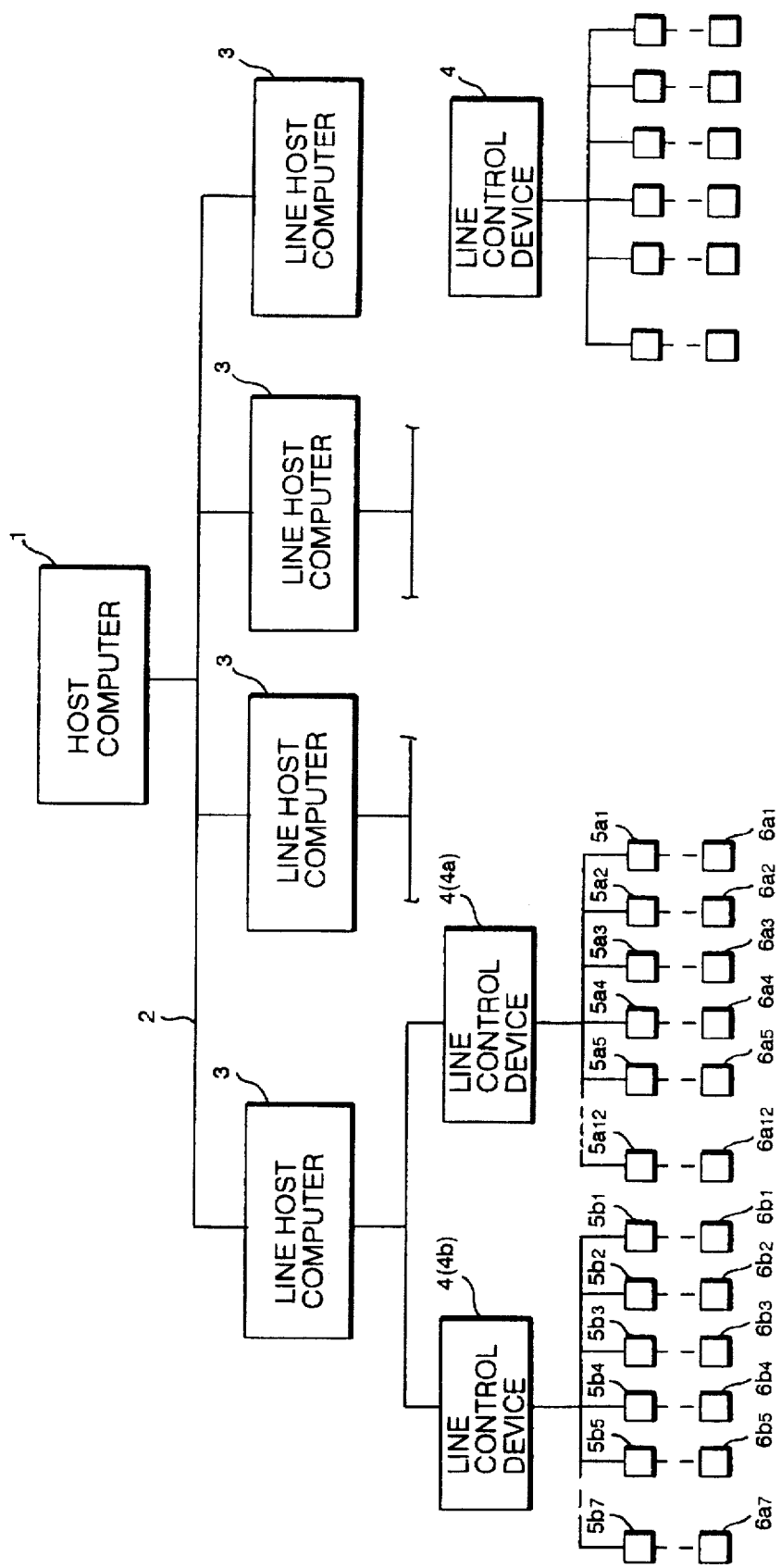
FIG. 1 is a schematic illustration showing a production control system for an automobile production plant in accordance with a preferred embodiment of the present invention.

Referring now to the drawings in detail, and in particular, to FIG. 1, a production control system used in an automobile production factory, such as where different types but functionally the same work units, for instance axle hub units in this embodiment, to be fitted or assembled to different models of front engine-front drive cars are produced, is schematically shown. The production control system for such an automobile production factory includes a host computer 1 to store various production control information or data on, for instance, control of the entire factory, vehicle assembling schedules at a plurality of assembling work shops, body painting schedules at a plurality of painting work shops, a schedule for assembling fittings to car bodies so as to complete vehicle units at a plurality of assembling work shops, and a schedule of delivery of finished vehicles. These production control information are transmitted, through a data communications line or circuit 2, to line host computers 3 equipped at the body assembling work shops, the body painting work shops, the vehicle unit assembling work shops, and a plurality of work shops for producing parts, subassemblies of the parts, such as axle hubs, suspension apparatuses, engines, transmissions, etc., and various instrument units. Each of these line host computers 3 is interfaced to a plurality of second control means or line control devices 4 (4a and 4b), each of which transmits data in 16 bits to first control means or terminal control devices $5a_1$–$5a_{12}$ and $5b_1$–$5b_7$, such as programmable logic controllers (PLCs), for controlling automatic apparatuses $6a_1$–$6a_{12}$ and $6b_1$–$6b_7$, respectively.

Figure 2:
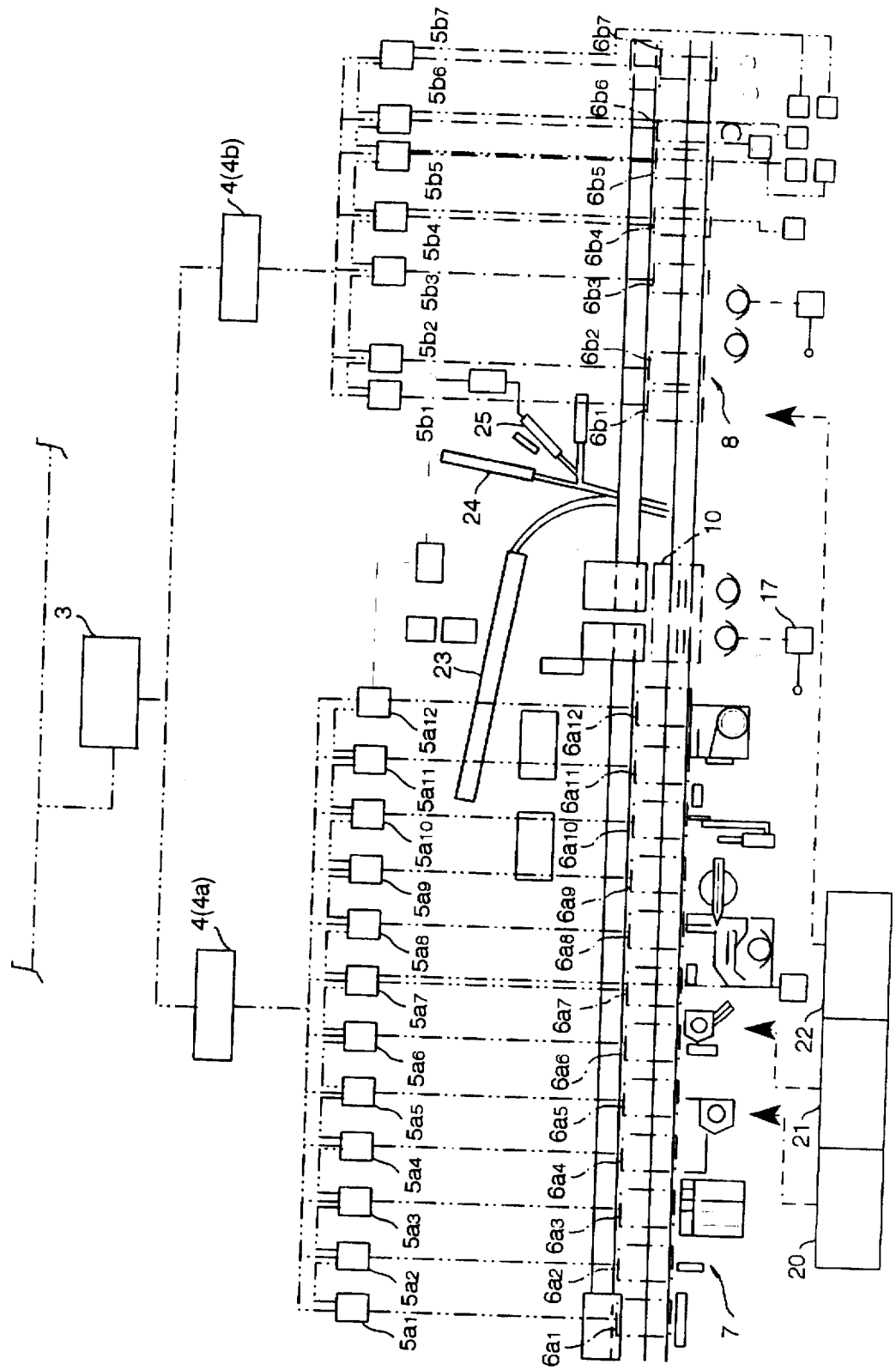
FIG. 2 is a schematic illustration showing an axle hub units production line included in the automobile production plant.
Figure 3:
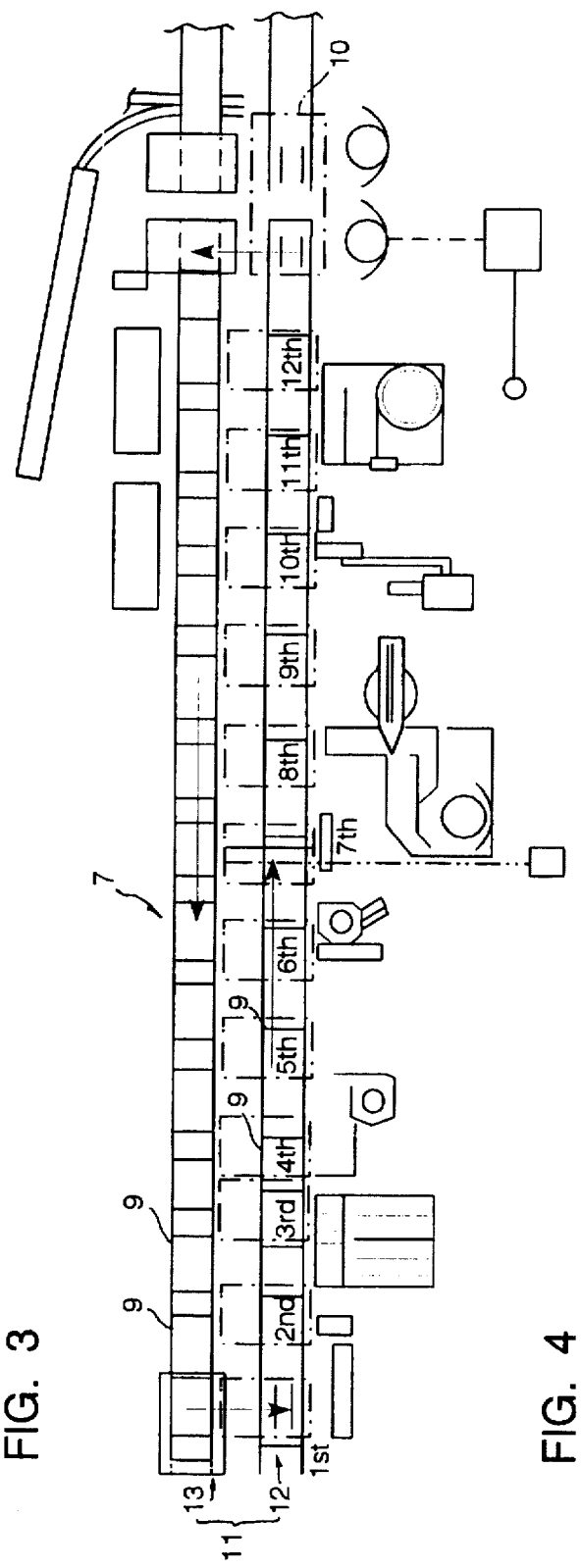
FIG. 3 is a schematic plan view of a first work station line where a plurality of work stations are arranged in a row.
Figure 4:
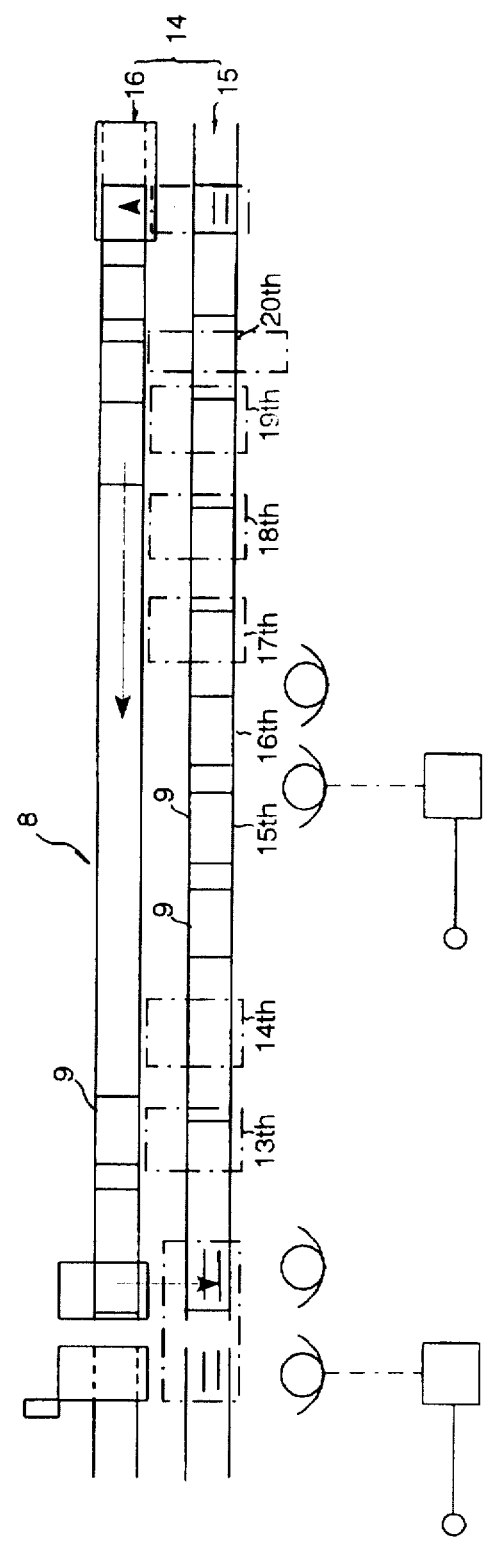
FIG. 4 is a schematic plan view of a second work station line where a plurality of work stations are arranged in a row.

FIGS. 2–4 show an overall production facility including automatic working apparatuses $6a_1$–$6a_{12}$ and $6b_1$–$6b_7$ for producing different types of front axle hub units for different models of front engine-front drive vehicles. On first and second transportation lines 7 and 8 arranged in a straight line above a row of the automatic working apparatuses $6a_1$–$6a_{12}$ and $6b_1$–$6b_7$, there are placed hub component parts, half-finished hub units and finished hub units. Each of the adjacent terminal control devices $5a_1$–$5a_{12}$ are interfaced so as to transmit information signals from one to another. Similarly, each of the adjacent terminal control devices $5b_1$–$5b_7$ are interfaced so as to transmit information signals from one to another. As seen in FIG. 3, first to twelfth work stations (1st–12th) where the automatic apparatuses $6a_1$–$6a_{12}$ for performing specified operations, such as machining and assembling, are equipped, respectively, are arranged in a row along the first transportation line 7. Similarly, as seen in FIG. 4, thirteenth to twentieth work stations (13th–20th) where the automatic apparatuses $6b_1$–$6b_7$ for performing specified operations are equipped, respectively, are arranged in a row along the first transportation line 7. The first transportation line 7 includes a floating type of first pallet circulation means 11 which has a conveyer 12 for forwarding pallets 9 with component parts placed thereon through the first to twelfth work stations (1st–12th) and a return conveyer 13 for returning empty pallets 9 from the twelfth work station (12th) toward the first work station (1st). The conveyor 12 is capable of placing thereon fourteen pallets 9 and forwarding them intermittently one after another through the respective work stations. The return conveyer 13 is capable of placing thereon at most fourteen pallets and returning them from the twelfth work station (12th) toward the first work station (1st). Similarly, the second transportation line 8 includes a floating type of second pallet circulation means 14 which has a conveyer 15 for forwarding pallets 9 with component parts placed thereon by way of the thirteenth to twentieth work stations (13th–20th) and a return conveyer 16 for returning empty pallets 9 from the twentieth work station (20th) toward the thirteenth work station (13th). The conveyor 15 is capable of placing thereon eleven pallets 9 and forwarding them intermittently one after another to the respective work stations. The return conveyer 13 is capable of placing thereon at most fourteen pallets and returning them from the twentieth work station (20th) toward the thirteenth work station (13th).

Between the first and second transportation lines 7 and 8, there is disposed a hanger type of parts transfer apparatus 10 for transferring a component part on a pallet 9 placed on the conveyor 12 after the twelfth work station (12th) onto an empty pallet 9 on the conveyor 15 before the thirteenth work station (13th). This work transfer apparatus 10 is provided with an operation unit 17 by means of which an operator operates the work transfer apparatus 10.

Near the first transportation line 7, there are installed parts arrangement stations 20–22 for preparing and arranging different specific component parts for a plurality of particular work stations among the first to twentieth work stations (1st–20th). Specific component parts are transported on motor driven transport cars, or otherwise by hand-trucks, to the respective particular work stations at an appropriate timing. Further, there are installed in close proximity to the thirteenth work station (13th) of the second transportation line 8 a parts supply apparatuses 23–25 for supplying parts to empty pallets 9 returned to the thirteenth work station (13th).

Figure 5:
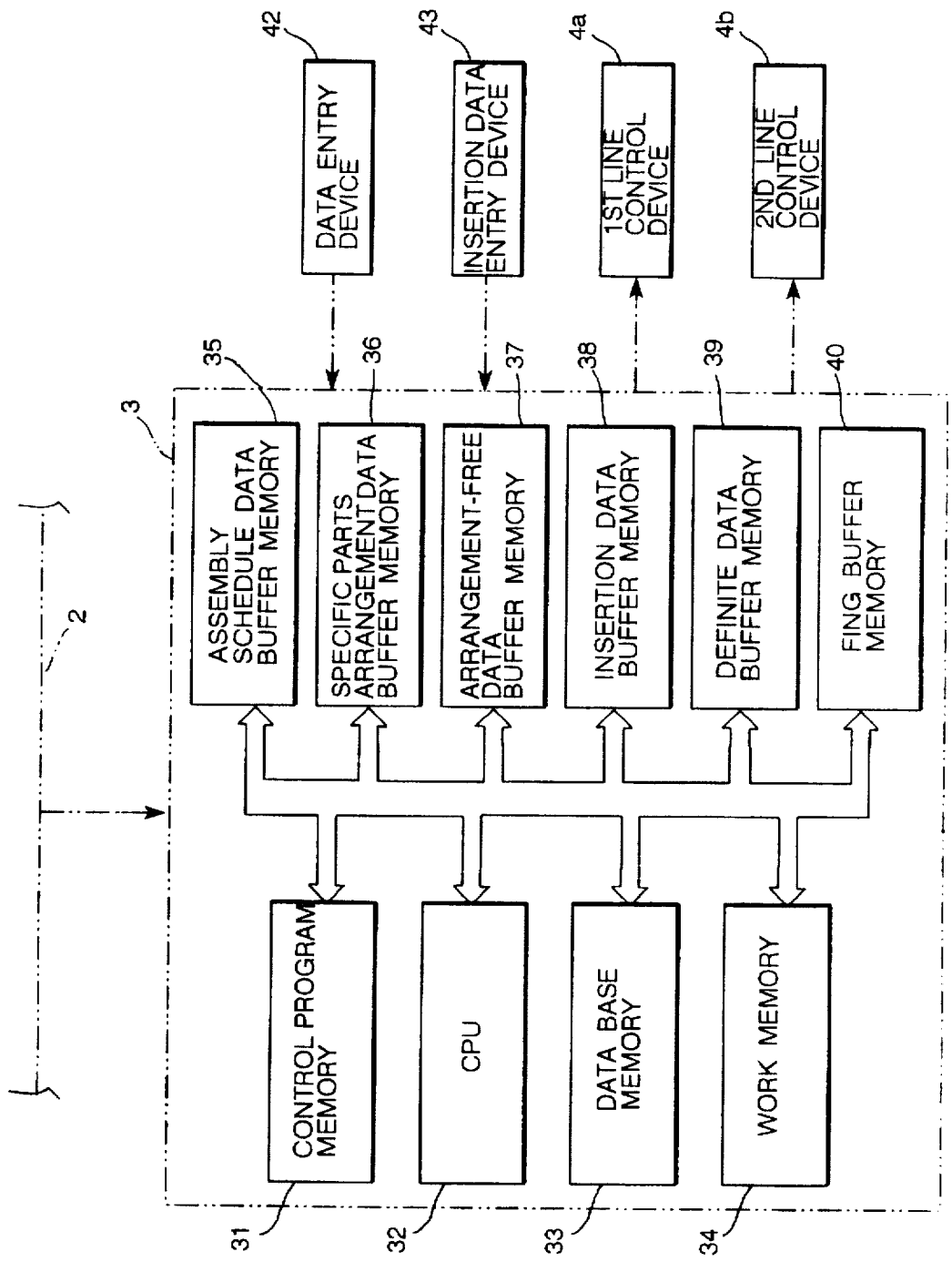
FIG. 5 is a block diagram illustrating a primary line computer and its associated devices.
Figure 6:
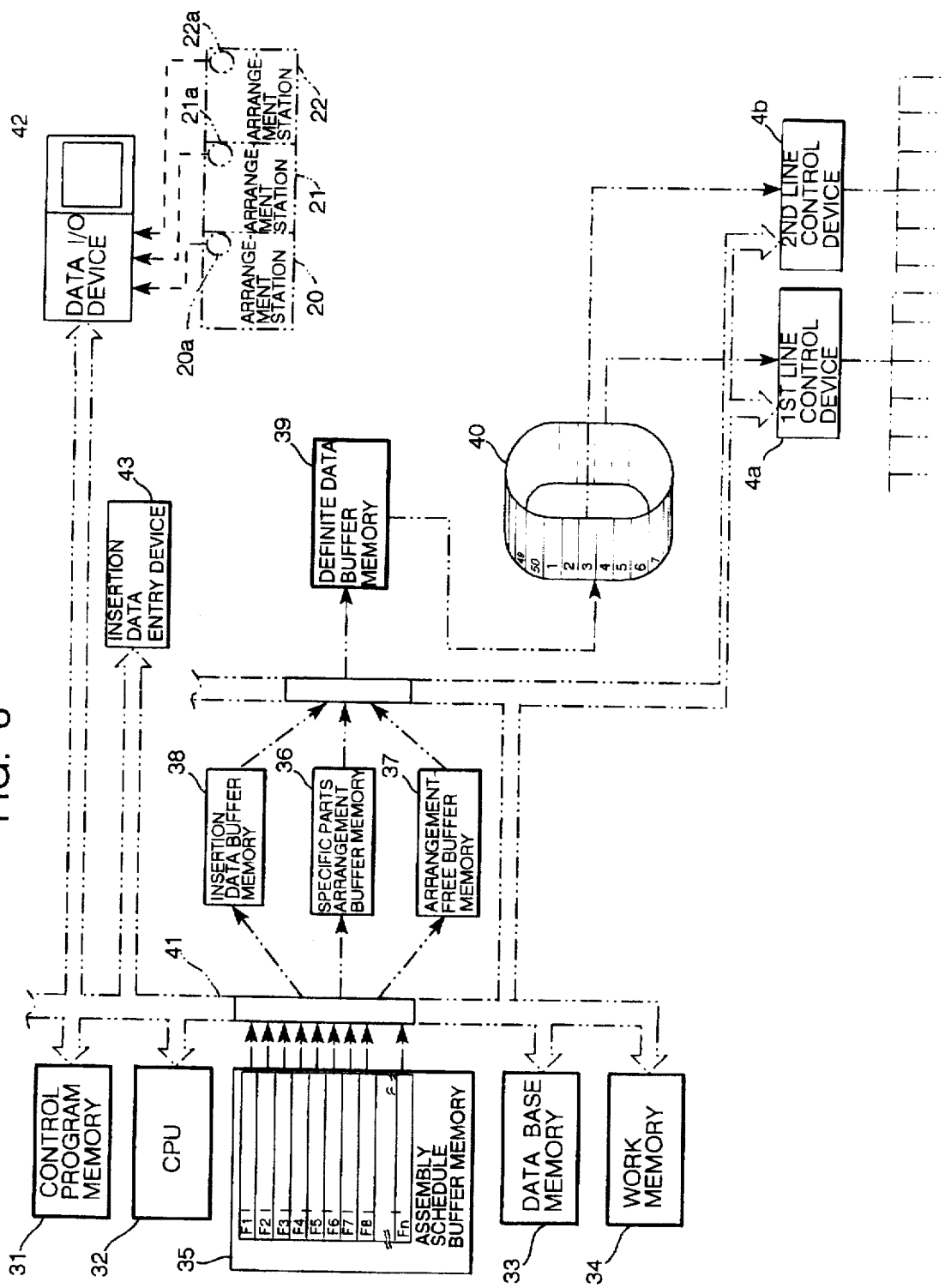
FIG. 6 is an illustration showing data transmission from the primary line computer.
Figure 7:
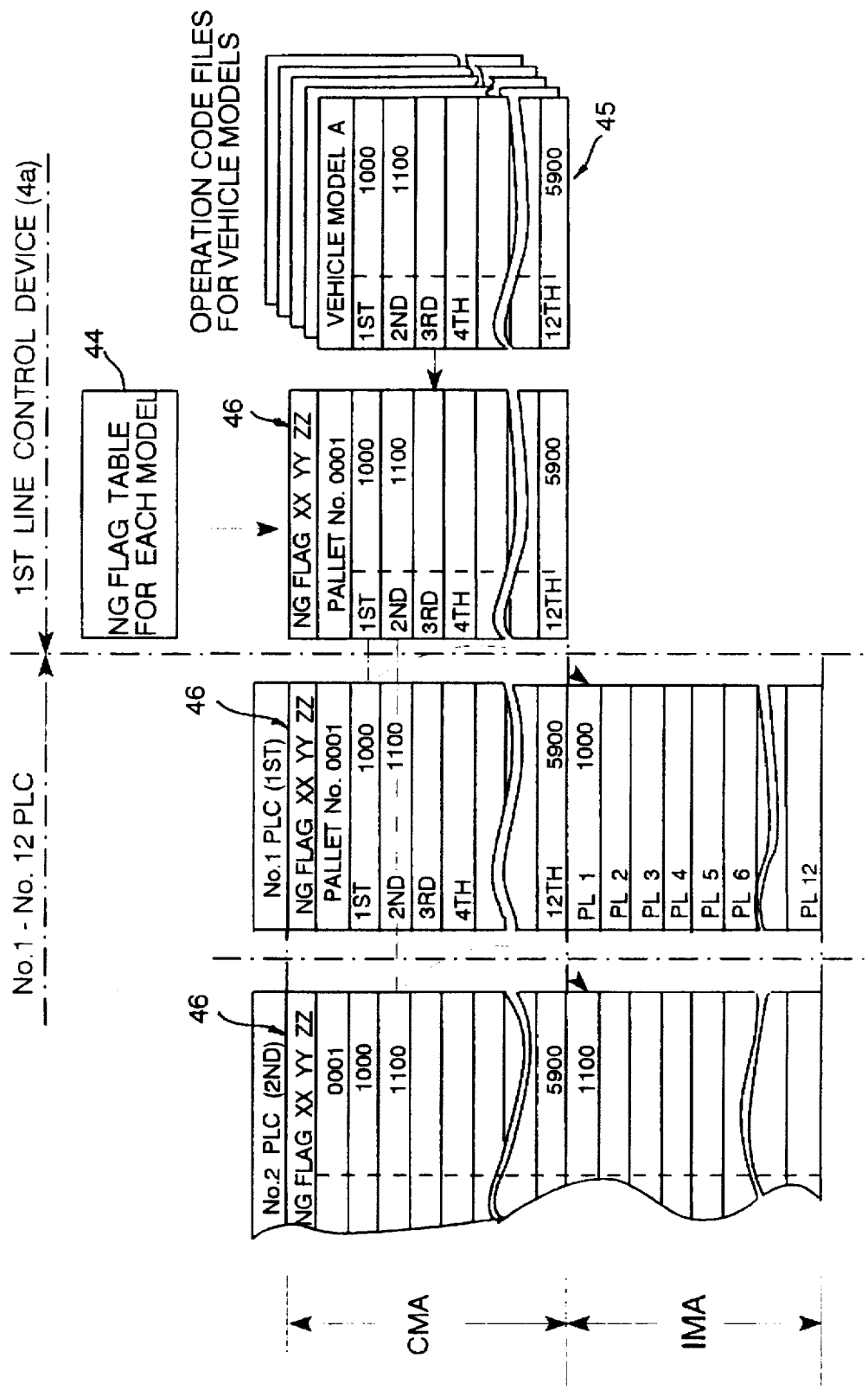
FIG. 7 is an illustration showing data interface between a line control device and a terminal control device.

Referring to FIGS. 5–7 schematically showing the production control system, the line host computer 3 is organized by various memories, such as a program memory 31 for storage of various control programs, a central processing unit (CPU) 32, a data memory 33 for storage of a data base, a work memory 34 for storage of data on computations and results of these computations, a buffer memory 35 for storage of data on vehicle assembling schedules transmitted from the host computer 1 through the data communications line 2, a buffer memory 36 for storage of data on parts preparation and arrangement, a buffer memory 37 for storage of data on needlessness of parts preparation and arrangement (which is hereafter referred to as a parts arrangement-free data buffer memory), a buffer memory 38 for storage of data on insertion of extra parts, a buffer memory 39 for storage of definite data and a ring buffer memory 40. All of these memories 31–40 are interfaced to a bus 41. The line host computer $3_1$ is interfaced to various peripheral devices, such as I/O devices 42 incorporated in the respective parts arrangement stations 20–22, a data entry device 43 through which data are put into the host computer 3, and the line control devices 4a and 4b, so as to transmit 16 bits data to and receive 16 bits data from these peripheral devices 42, 43, 4a and 4b.

As shown in FIG. 6, the vehicle assembling schedule data buffer memory 35 has 1st to n-th bands (F1–Fn) assigned to the same number of vehicle assembling work shops F1–Fn. The i-th band (i is the positive integer from 1 through n) stores, in order of date and time of assembling, various data on models of vehicles to be assembled in the i-th vehicle assembling work shop Fi, date and times of initiation of assembling first vehicles of the respective models, and acceptance times of the data. These data on vehicle models and assembling dates and times are hereafter referred to as basic instructions data or information. The parts arrangement data buffer memory 36 stores the basic instructions data of particular vehicle models which need preparation and arrangement of specific component parts at the parts arrangement stations 20–22. The basic instructions data are transmitted from the vehicle assembling schedule data buffer memory 35 in order of assembling date and time. It is noted that the term "specific component parts" used herein shall mean and refer not only to component parts having particular structures but also to parts to be attached to work units for a particular model of vehicles for certain reasons of assembling at particular vehicle assembling work shops and/or certain reasons of transportation of these work units to particular vehicle assembling work shops. The parts arrangement-free data buffer memory 37 stores the basic instructions data of the particular vehicle models for which parts are not needed at the parts preparation and arrangement stations 20–22. The basic instructions data are transmitted from the vehicle assembling schedule data buffer memory 35 in order of assembling date and time. The insertion parts data buffer memory 38 stores, in order of assembling date and time, the basic instructions data of functionally the same work units for a plurality of models of vehicle which are necessary to be manufactured independently from vehicles to be assembled in the vehicle assembling work shop in a period in which the first and second transportation lines 7 and 8 are not so busy. The basic instruction data are entered through the data entry device 43. The data base contains data on vehicle models for which parts preparation and arrangement are not needed to be prepared and arranged at the parts arrangement stations 20–22, vehicle models including work units for which specific component parts are necessary to be prepared and arranged at the parts arrangement stations 20–22, a list of the necessary specific component parts, and work stations to which the specific component parts must be delivered.

The definite data buffer memory 39 stores the basic instructions data, transmitted from the parts arrangement data buffer memory 36, the parts arrangement-free data buffer memory 37 and the insertion parts data buffer memory 38, which indicate the definite order of assembling and manufacturing vehicles fixed preferentially in order of assembling date and time. The ring buffer memory 40 comprises first to fiftieth bands and stores data the basic instructions data transmitted from the definite data buffer memory 39 in these bands in order from the first to the fiftieth repeatedly. The ring buffer memory 40 is adapted such that, after having transmitted the basic instructions data in an i-th band to the line control device 4a, it writes the definite basic instructions data transmitted from the definite data buffer memory 39 in the i-th band and immediately thereafter, transmits the basic instructions data in an (i-m)-th band to the line control device 4b. Here, the number "m," which is a positive integer, indicates the number of component parts on the conveyer 12 of the first transportation line 7, i.e. the number of pallets 9 on the conveyer 12, which is 14 in this instance.

As shown in FIG. 7, the line control device 4a comprises a computer having a program memory loaded with control programs, a file memory for storage of at least NG flag tables 44 for various vehicle models and operation code files 45 for various vehicle models and work stations, a work memory having a common memory area (CMA) for storage of data of operation code tables 46, and a center processing unit (CPU). The NG flag table 44 stores data on NG flags with regard to operations performed at preceding work stations. For example, NG flags are initially set up for all operations at all work stations and each NG flag with regard to an operation is reset down in a terminal control device $5a_1$–$5a_{12}$ whenever the operation is completed. Accordingly, looking up these NG flags enables confirmation of completion of the operations at the respective work stations and avoids occurrences of wrong operations such as erroneous machining and/or erroneous assembling. The operation code file 45 includes operation codes indicating types of operations at the respective work stations (1st–12th). For example, as shown in FIG. 7, an operation to be performed at the first work station (1st) is coded as "1000" for work units for a vehicle model A, an operation to be performed at the second work station (2nd) is coded as "1100" for the work units for the vehicle model A, and so forth. Each work station has a detector which detects signs indicating numbers assigned to respective pallets 9 and provides, for any one of the terminal control devices $5a_1$–$5a_{12}$ in association with a work station, a signal indicating a pallet number of a pallet 9 located at the work station. Consequently, any pallet 9 is recognized at any work station by its pallet number. The line control device 4a accepts the basic instructions data from the ring buffer memory 40 of the line host computer 3. Simultaneously, the line control device 4a recognizes the pallet number of a pallet at the first work station (1st) according to a pallet number signal provided by the detector and, based on the pallet number, looks up the NG flag table 44 and the operation code file 45 so as to prepare operation code tables 46, such as shown in FIG. 7, data of which are stored in the common memory area (CMA). These operation code tables 46 contain data on at least a plurality of NG flags, a pallet number, operation codes for operations at a plurality of the work stations.

Each of the terminal control devices $5a_1$–$5a_{12}$ which control specified operations of the automatic apparatuses $6a_1$–$6a_{12}$ at the first to twelfth work stations (1st–12th), respectively, is organized by a microcomputer having a control program memory, a work memory and a center processing unit (CPU). The program memory is previously loaded with operation control programs for controlling the automatic working apparatuses $6a_1$–$6a_{12}$ according to operation codes so as to perform specified machining and/or assembling. The work memory has a common memory area similar to the line control device 4a shown in FIG. 7 and has an individual memory area (IMA) exclusive thereto for storage of operation codes at the respective work stations.

The line control device 4a provides for the line host computer 3 an instruction of transmission of the basic instructions data when an empty pallet 9 is forwarded to the upstream end work station, namely the first work station (1st). Upon acceptance of the basic instructions data, the line control device 4a prepares operation code tables 46 and stores them in the common memory area (CMA) once and subsequently, transmits them collectively to their associated terminal control devices $5a_1$–$5a_{12}$. Then, each terminal control device $5a_1$–$5a_{12}$ stores the operation code table 46 in the common memory area (CMA) and transfers the data on operation codes in connection with its associated work station in its individual memory area (IMA). The respective terminal control devices $5a_1$–$5a_{12}$ control their associated automatic apparatuses $6a_1$–$6a_{12}$ to perform specified machining and/or assembling on work units placed on pallets 9 at the respective work stations according to the operation codes stored in the individual memory areas (IMA).

The operation of the line control device 4a governing the twelve terminal control devices $5a_1$–$5a_{12}$ is true of operation of the line control device 4b governing the seven terminal control devices $5b_1$–$5b_7$, so that another description is not necessary. The line control device 4b stores data of the operation code tables 46, prepared according to the basic instructions data transmitted from the ring buffer memory 40, in its common memory area and thereafter, transfers the data collectively to the respective terminal control devices $5b_1$–$5b_7$.

Various controls which are performed by the line host computer 3 will be best understood by reviewing FIGS. 8–12, which are flow charts illustrating various routines for the host computer 3. Programming a computer is a skill well understood in the art. The following description is written to enable a programmer having ordinary skill in the art to prepare an appropriate program for the computer. The particular details of any such program would of course depend upon the architecture of the particular computer selected.

Figure 8:
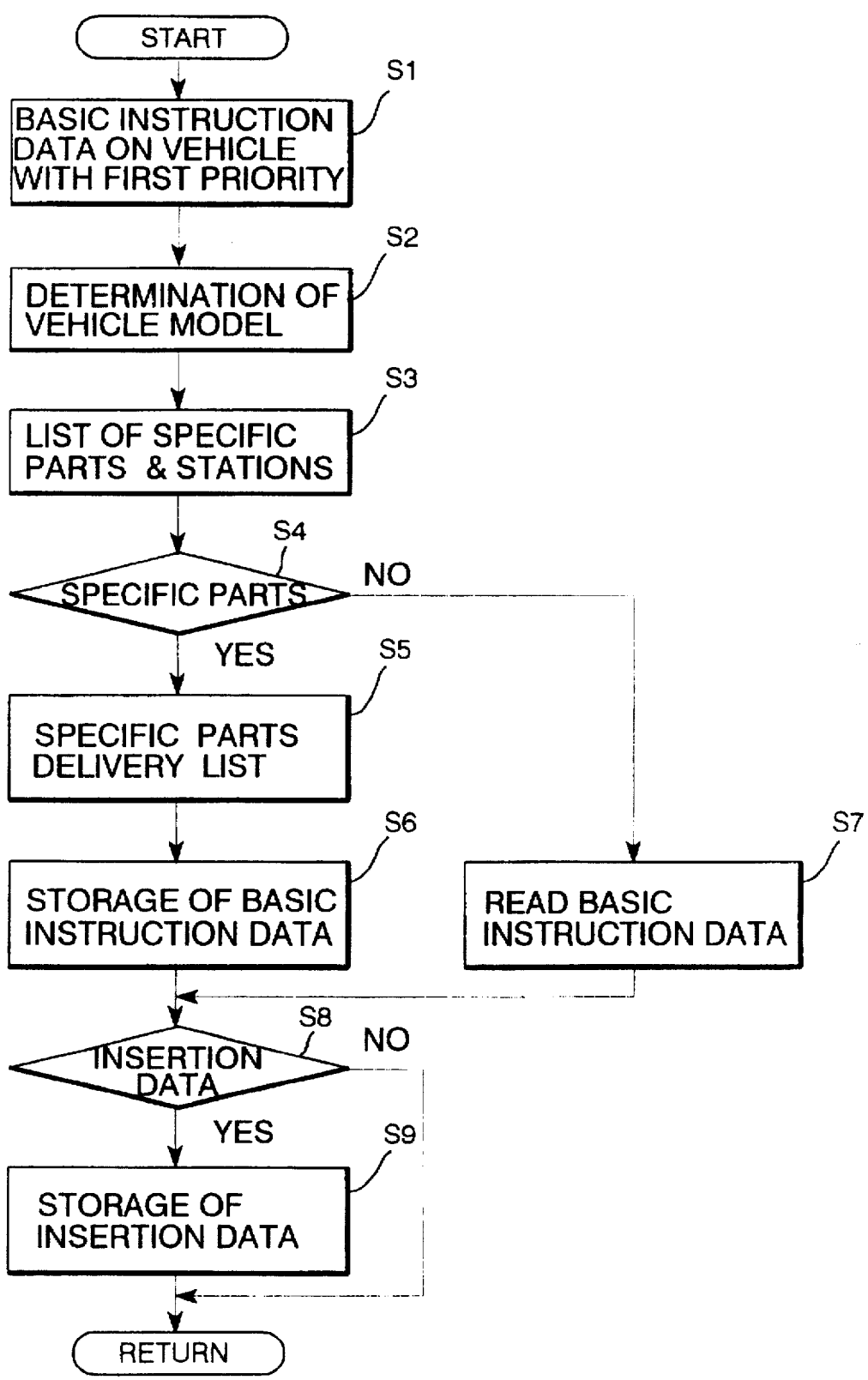
FIG. 8 is a flow chart illustrating a basic instructions data write routine for writing basic instructions data into a parts arrangement data buffer memory 36, an uncalled-for parts arrangement data buffer memory 37 and an insertion parts data buffer memory 38.

FIG. 8 is a flow chart of a basic instructions data write routine for writing basic instructions data stored in the vehicle assembling schedule data buffer memory 35 and input through the data entry device 43 selectively into the parts arrangement data buffer memory 36, the parts arrangement-free data buffer memory 37 and the insertion parts data buffer memory 38 in time series. This routine is repeatedly executed in a predetermined short time with a short interval of time.

The routine commences and control directly passes to a function block at step S1 where the vehicle assembling schedule data buffer memory 35 is accessed to read out the basic instructions data on a vehicle with the highest priority of assembling. After determining a model of the vehicle on the basis of the basic instructions data at step S2, the data base in the data base memory 33 is accessed to determine whether the vehicle model necessitates specific component parts and, if it necessitates, a list of the specific component parts and work stations which need the specific component parts is provided at step S3. The data base contains all information necessary to assemble and manufacture various models of vehicles.

Subsequently, at step S4, a decision is made based on the result of data search at step S3 as to whether the vehicle model needs specific component parts. If the answer to the decision is "YES," then, at step S5, data on the delivery list of the specific component parts, a time of delivery of the specific component parts, and an instruction timing at which the parts preparation and arrangement takes place (which are referred to as delivery instruction data) are stored in the work memory 34. The specific component parts delivery time is defined as a time at which specific component parts are delivered to the work stations so as to be in time for pre-subassembling a work unit which takes place timely in cooperation with assembling a vehicle. The instruction timing is a timing at which instructions of preparation and arrangement of specific component parts are transmitted to the parts arrangement stations 20–22 and which is determined based on the specific component parts delivery time and a time necessary for preparation and arrangement of the specific component parts at the parts arrangement stations 20–22. After having stored the data on the delivery list and these times, the basic instruction data are transmitted to and stored in the parts arrangement data buffer memory 36 in order of assembling at step S6. On the other hand, if the decision made at step S4 is "NO," this indicates that the vehicle model does not necessitate any specific component parts, then, at step S7, the basic instruction data read out from the vehicle assembling schedule data buffer memory 35 at step S1 are transmitted to and stored in the parts arrangement-free data buffer memory 37. In this instance, reading out the basic instruction data from the vehicle assembling schedule data buffer memory 35 is performed so as to allow a plenty of time for preparation and arrangement of necessary specific component parts at the parts arrangement stations 20–22. For this purpose, each of the parts arrangement data buffer memory 36, the parts arrangement-free data buffer memory 37 and the insertion parts data buffer memory 38 is given a sufficiently large quantity of memory.

Thereafter, another decision is made at step S8 as to whether insertion parts data, which contain the basic instruction data, are put in through the data entry device 43. If the answer to the decision is "YES," the insertion parts data are transmitted to and stored in the insertion parts data buffer memory 38 at step S9. After the storage of insertion parts data at step S8 or if the answer to the decision made at step S8 is "NO," the final step orders return to repeat another routine. In this manner, the basic instruction data are stored in each of these parts arrangement data buffer memory 36, parts arrangement-free data buffer memory 37 and insertion parts data buffer memory 38 in order of assembling.

Figure 9:
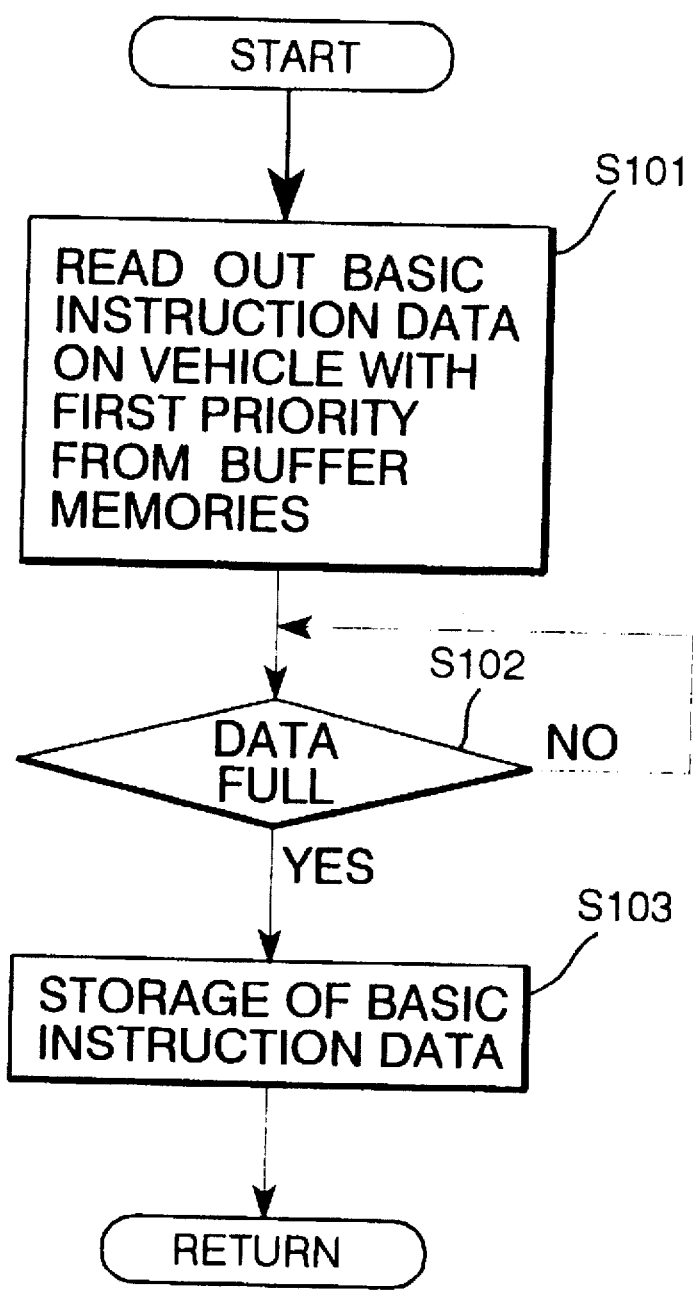
FIG. 9 is a flow chart of a basic instruction data write routine for writing basic instruction data into a definite data buffer memory.

FIG. 9 is a flow chart of a basic instruction data write routine for transmitting basic instruction data from the parts arrangement data buffer memory 36, the parts arrangement-free data buffer memory 37 and the insertion parts data buffer memory 38 to the definite data buffer memory 39 and writing them into the definite data buffer memory 39.

The routine is initiated and control directly passes to a function block at step S101 where data in the buffer memories 36, 37 and 38 are accessed to read out the basic instruction data on a vehicle model with the highest priority of assembling. Subsequently, a decision is made at step S102 as to whether the definite data buffer memory 39 is filled with data or has no free memory area. This decision is repeated at an interval until the definite data buffer memory 39 has a free memory area. If the answer to the decision is "YES," the basic instruction data is transmitted to and stored in the definite data buffer memory 39 in order of assembling.

Figure 10:
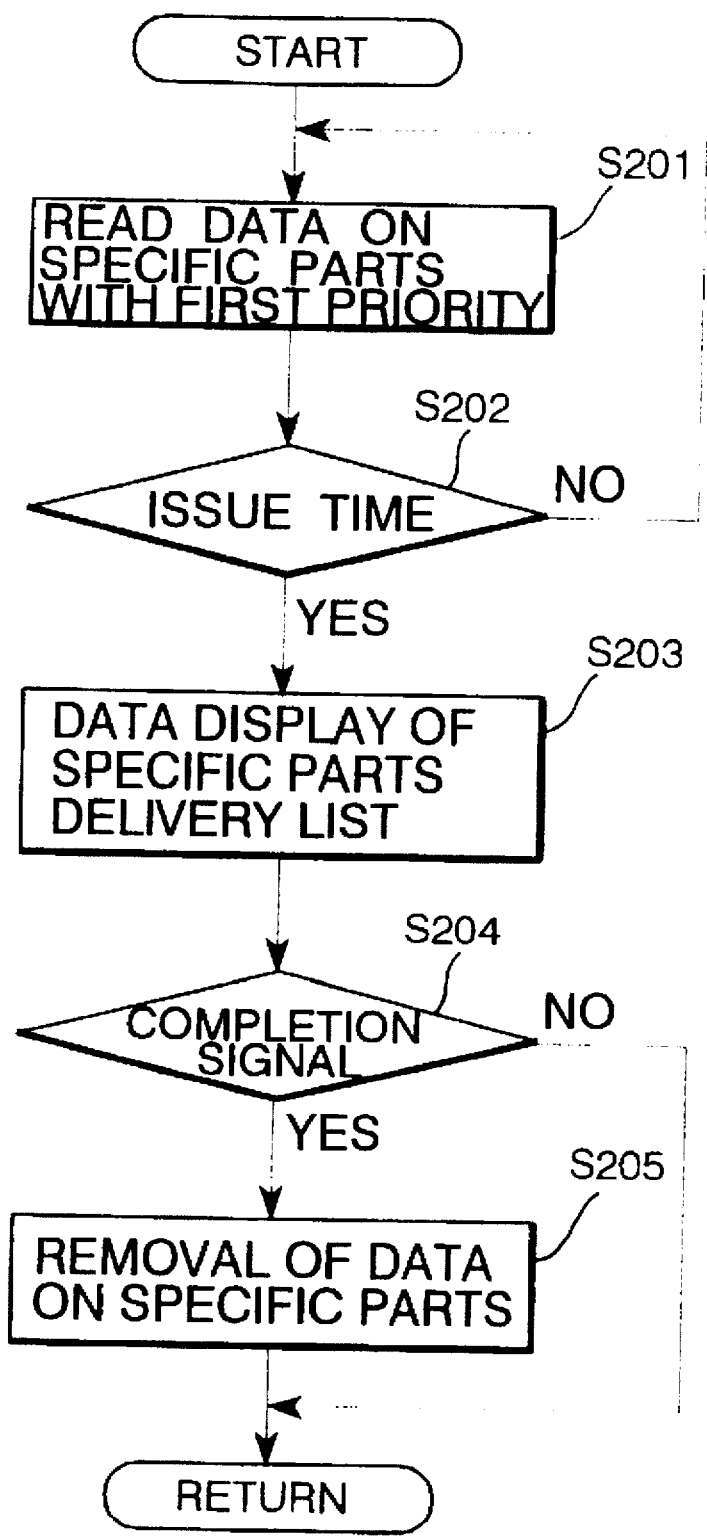
FIG. 10 is a flow chart of a specific parts arrangement instruction routine for giving instructions to specific parts arrangement stations.

FIG. 10 is a flow chart of a parts preparation and arrangement instruction routine for giving instructions to the parts arrangement stations 20–22. The routine is initiated and control directly passes to a function block at step S201 where data on specific component parts for a vehicle unit with the highest priority of assembling are retrieved or read out. Subsequently, a decision is made at step S202 as to whether it is a time of issuing an instruction based on data on instruction timings of specific parts preparation and arrangement contained in the retrieved data on specific component parts. This decision is repeated at an interval until the answer becomes "YES." When the "YES" answer is provided, data on instructions indicating a list of specific component parts, work stations to which specific component parts are delivered and delivery times are transmitted to the I/O device 42 and displayed thereon at step S203. At the parts arrangement stations 20–22, specific component parts listed are prepared according to the instructions and delivered and arranged as instructed before or by the delivery time. After the preparation and arrangement of specific component parts, an operator pushes a switch 20a–22a of any parts arrangement stations 20–22 so as to provide a preparation and arrangement signal, indicating completion of specific component parts preparation and arrangement, to the line host computer 31 from the I/O device 42.

Thereafter, another decision is made at step S204 as to whether there is provided a signal indicating completion of the preparation and arrangement of specific component parts. If the answer to the other decision is "YES," then, data on specific component parts having been arranged are removed from the work memory 34. After removal of data on prepared and arranged specific component parts at step S205 or if the answer made at step S204 to the other decision is "NO," the final step orders return to repeat another routine. In this manner, an instruction of specific component parts preparation and arrangement causes the parts arrangement stations 20–22 to deliver specific component parts timely before or in time for production of a subassembly.

Figure 11:
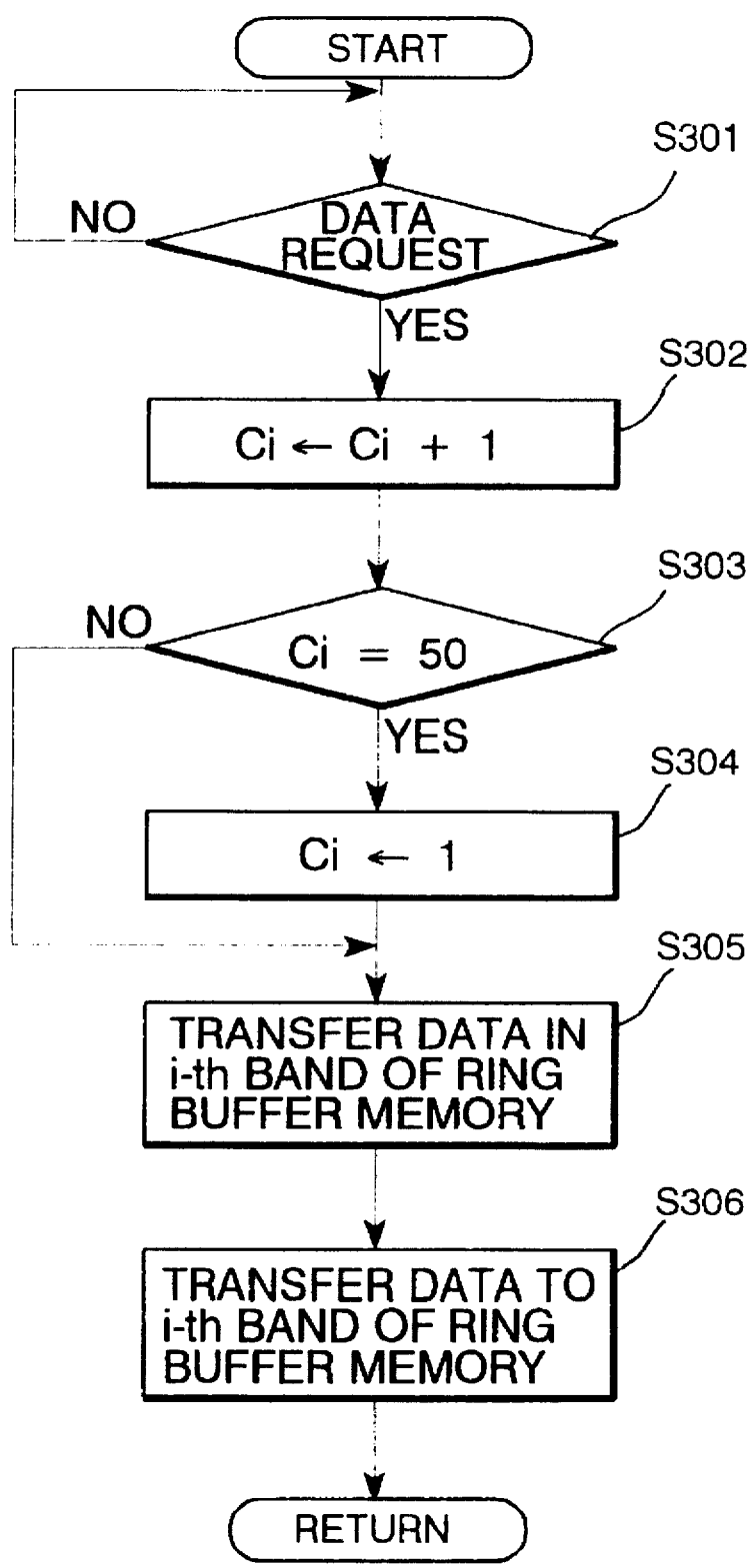
FIG. 11 is a flow chart illustrating a data read routine for reading out basic instruction data to a first line control device.
Figure 12:
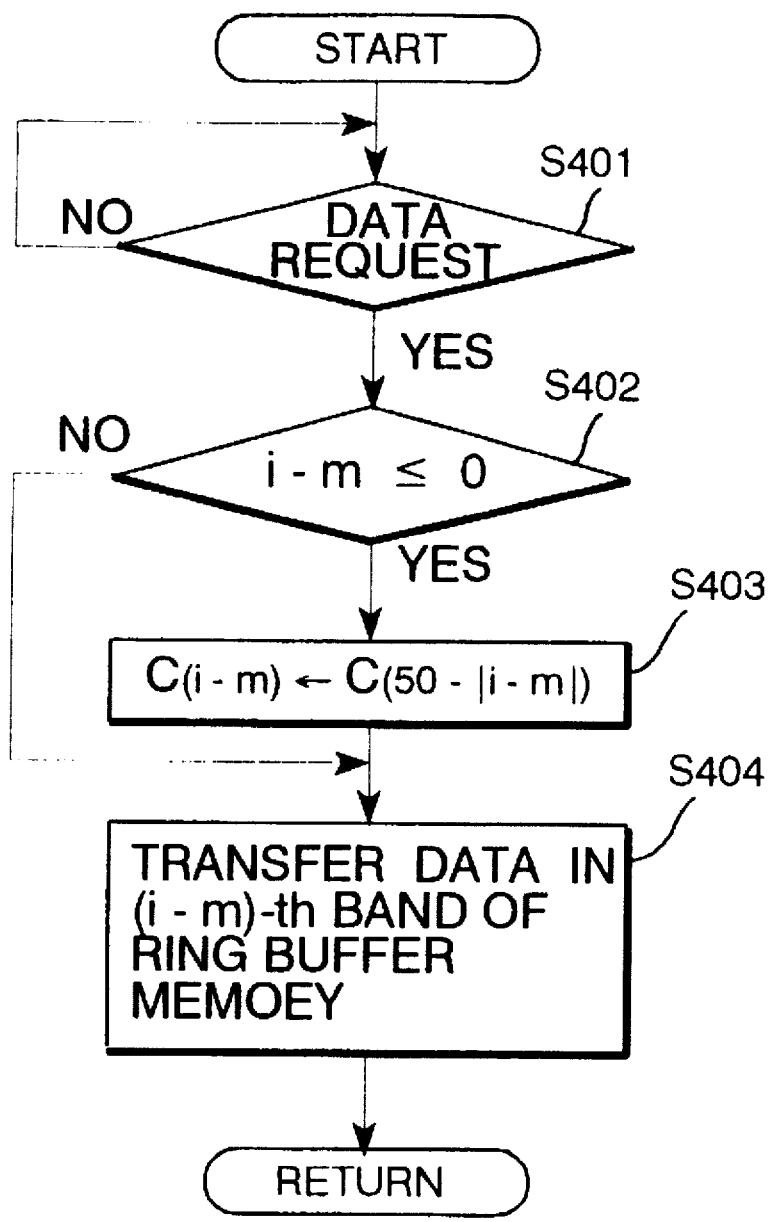
FIG. 12 is a flow chart illustrating a data read routine for reading out basic instruction data to a second line control device.

FIGS. 11 and 12 show flow charts of data read routines for processing reading out basic instruction data from the ring buffer memory 40 of the line host computer 31 and transmitting them to the line control devices 4a and 4b, respectively.

The data read routine shown in FIG. 11 is initiated and control passes directly to a decision block at step S301 where a decision is made as to whether there is a request of data from the line control device 4a. This decision is repeated until a request of data. If the answer to the decision is "YES," a count $C_i$, which indicates an i-th band of the ring buffer memory 40 having basic instruction data and is stored in the work memory 34, is changed by an increment of one (1) at step S302. Subsequently, another decision is made at step S303 as to whether the count $C_i$ has reached fifty (50). Directly after the other decision if the answer is "NO" or after resetting the count $C_i$ to one (1) at step S304 if the answer to the other decision is "YES," the basic instruction data in the i-th band of the ring buffer memory 40 is transmitted to the line control device 4a at step S305 and basic instruction data for a vehicle unit having the highest priority of assembling in the definite data buffer memory 39 is read out and transmitted to the i-th band of the ring buffer memory 40 at step S306. The final step orders return.

In FIG. 12, the data read routine is initiated and control passes directly to a decision block at step S401 where a decision is made as to whether there is a request of data from the line control device 4b. This decision is repeated until a request of data. If the answer to the decision is "YES," the number "i" is compared with a number "m" which, as was previously described, indicates the number of component parts placed on pallets 9 on the conveyer 12 of the first transportation line 7. If the number "i" is equal to or less than the number "m," then, a count $C(50-li-ml)$ is substituted for the count $C(i-m)$ at step S403. After the replacement of count $C(50-li-ml)$ for the count $C(i-m)$ at step S403 or if the answer to the decision is "NO," basic instruction data in the $(i-m)$-th band of the ring buffer memory 40 is read out at step S404 and the routine returns.

In this way, basic instruction data in the $(i-m)$-th band of the ring buffer memory 40 are successively transmitted to the line control device 4b. A band of the ring buffer memory 40 which is accessed in order to transmit basic instructions data to the second line control device 4b is m bands ahead of a band of the ring buffer memory 40 which is accessed in order to transmit basic instruction data to the line control device 4a. This is because a component part placed on the foremost pallet 9 on the conveyor 15 of the second transportation line 8 precedes m pallets ahead of a component part placed on the foremost pallet 9 on the conveyor 12 of the first transportation line 7.

Figure 13:
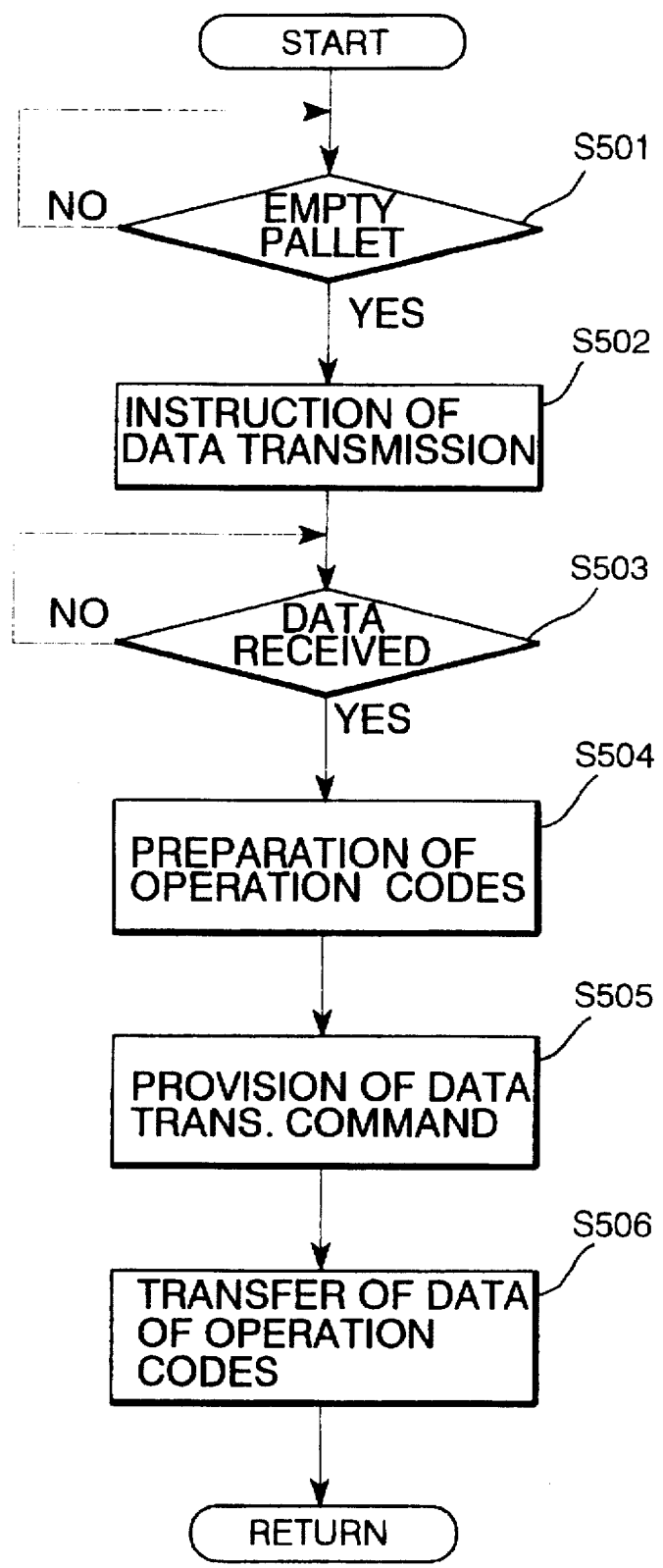
FIG. 13 is a flow chart illustrating an operation code table construction and transfer routine.

FIG. 13 shows a flow chart of an operation code table construction routine which is implemented repeatedly with a short interval of time with the line control device 4a. The operation code table construction routine is initiated and control passes directly to a decision block at step S501 where a decision is made as to whether an empty pallet 9 has been transported into the first work station (1st). This decision is repeated at an interval until the answer becomes "YES." When the "YES" answer is provided, the line host computer $3_1$ is given an instruction to transmit data at step S502. Subsequently, another decision is made at step S503 as to whether the line host computer $3_1$ has transmitted basic instruction data to the line control device 4a. This decision is repeated until the entire of basic instruction data has been transmitted. If the answer to the decision is "YES," then, a table of codes for various operations is constructed or built according to the basic instruction data at step S504 and stored in the common memory area (CMA). Subsequently, when the line control device 4a provides for the first to twelfth terminal control devices $5a_1$–$5a_{12}$, which the line control device 4a governs, a data transfer command, respectively, at step S505, data of the operation code table are transferred to the respective terminal control devices $5a_1$–$5a_{12}$ all at once at step S506.

Figure 14:
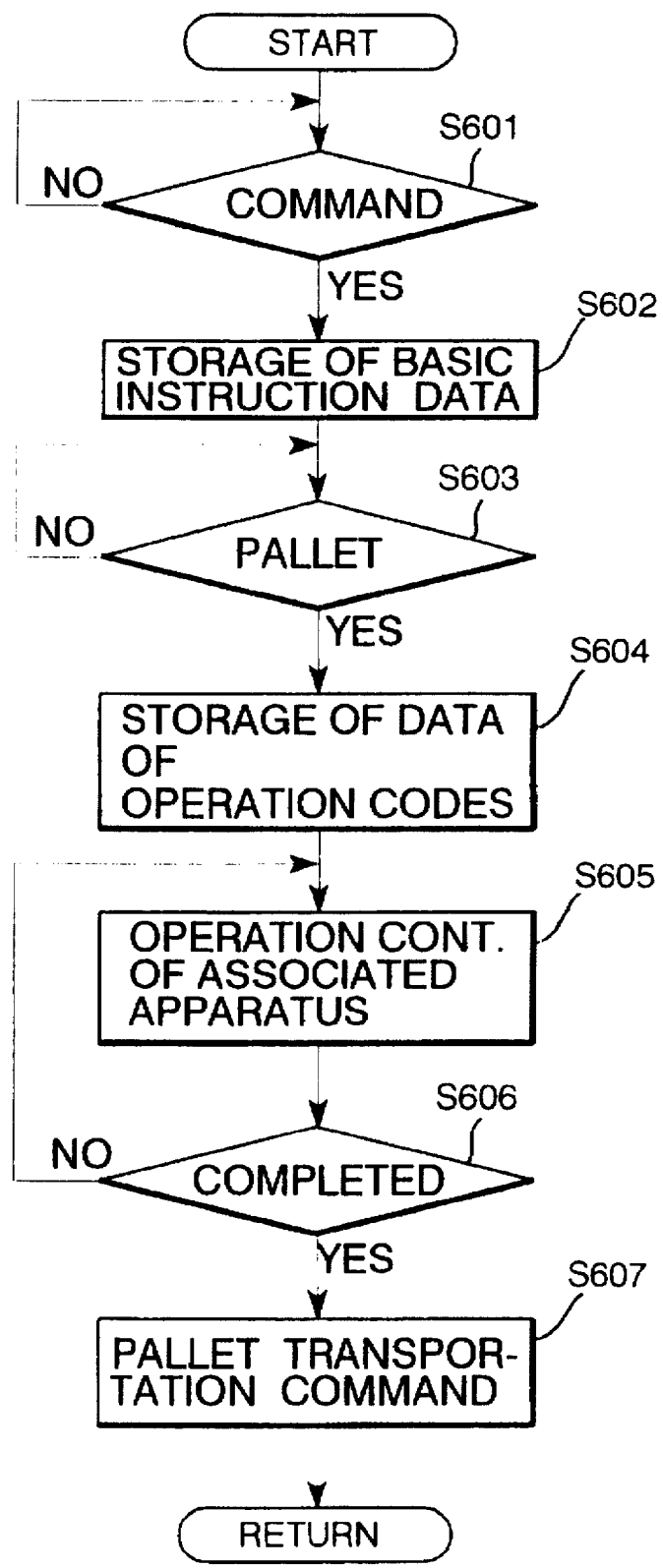
FIG. 14 is a flow chart illustrating an operation control routine for each terminal control device.

FIG. 14 shows a flow chart of an operation control routine which is implemented repeatedly with a short interval of time with the respective terminal control devices $5a_1$–$5a_{12}$.

The operation control routine is initiated and control passes directly to a decision block at step S601 where a decision is made as to whether there has been given a data transfer command. This decision is repeated until the answer becomes "YES." When the "YES" answer is provided, then, after having stored the basic instruction data transmitted from the line control device 4a in the common memory area (CMA) at step S602, a decision is made at step S603 as to whether a work pallet 9 has been transported into the work station in an association with each terminal control device $5a_1$–$5a_{12}$. If the answer to the decision made at step S603 is "YES," then, data of the operation code for the associated work station is transferred into the individual memory area (IMA) from the common memory area (CMA) at step S604. Subsequently, an appropriate operation control program is called up according to the operation code transferred into the individual memory area (IMA) so as to control the operation of the associated automatic apparatus $6a_1$–$6a_{12}$ at step S605. At step S606, a decision is made as to whether the operation, such as machining and assembling, has been completed. This decision is repeated at an interval until an completion of the operation. When the answer to the decision is "YES," then, at step S607, the terminal control device $5a_1$–$5a_{12}$ provides a command signal indicating transportation of the work pallet 9 to the following work station.

When an empty work pallet 9 is placed in position at the foremost work station on the conveyor 15 of the second transportation line 8 and loaded with a work unit thereon by the work transfer apparatus 10, basic instruction data is transmitted to the line control device 4b from the ring buffer memory 40 so as to execute an operation code table operation control routine and an operation control routine for the terminal control device $5b_1$–$5b_7$, and the automatic apparatus $6b_1$–$6b_7$, respectively, in the same manner for the terminal control devices $5a_1$–$5a_{12}$ and the automatic apparatus $6a_1$–$6a_{12}$. The position of work pallet 9 may be visually examined by an operator.

In operation of the production facility control system, the line host computer 3 receives basic instructions data from the host computer 1 and stores them in the vehicle assembly schedule buffer memory 35 in order of assembling time. The basic instructions data are grouped into two groups, namely a group of data to be transmitted to and stored in the parts arrangement data buffer memory 36 and a group of data to be transmitted to and stored in the parts arrangement-free data buffer memory 37, based on the data on vehicle models of work units and specific component parts necessary for the vehicle models of work units. The line host computer 3 provides for specific component parts to be prepared prior to machining and assembling work units delivery instruction data and transmits the delivery data to the I/O devices 42 of the respective parts arrangement stations 20–22. This enables necessary specific component parts to be reliably delivered to designated work stations at a timing suitable for producing work units, eliminating delay of production due to a delay of delivery of specific component parts and improving the productivity of the production facilities. Instructions of delivery of specific component parts are made automatically without relying on an operator, the delivery of specific component parts is reliable and efficient. In addition, the control system where basic instructions data for a vehicle model of work units which need specific component parts are stored in the parts arrangement data buffer memory 36 in order of assembling time admits specific component parts to be prepared and arranged well in advance.

Furthermore, in the control system, because a band of the ring buffer memory 40 out of which data is read and transmitted to the line control device 4a is m bands equal to the number m of work units on the conveyor 12 of the first transportation line 7 ahead of the band of the ring buffer memory 40 out of which data is read and transmitted to the line control device 4a, it is enabled to transmit basic instructions data directly to the line control device 4b without an intervention of the line control device 4a. This results in elimination of miscounting work units on the conveyor 12 of the second transportation line 8, and errors of machining and/or assembling work units and suspension of the conveyors 11 and 12 of the respective first and second transportation lines 7 and 8 due to the miscounting. Together, the offset data bands simplifies accessing the address to be read out.

The line control device 4a is provided with a common memory area (CMA) in which operation code files 45 are loaded for at least various vehicle models of work units and prepares an operation code table 46 for each vehicle model of work units looking up an operation code file 45 selected according to a vehicle model indicated by basic instructions data transmitted thereto from the line host computer 3 and, when once it has stored the operation code table 46 in the common memory area, transmits the operation codes to the individual memory areas (IMAs) of the respective terminal control devices $5a_1$–$5a_{12}$, respectively but all at once. Each terminal control device $5a_1$–$5a_{12}$ causes its associated automatic apparatus $6a_1$–$6a_{12}$ to perform the operation indicated by the operation code. The control system thus structured provides a great reduction in load of transmitting data, including at least operation codes, to the respective terminal control devices $5a_1$–$5a_{12}$ from the line control device 4a. Furthermore, when the first and second transportation lines 7 and 8 are restarted after suspension of either one or both of them due to some reasons, transmission of the operation code table 46, if necessary, is completed in a considerably short time, yielding a decrease in time necessary for the restoration of production line. Alternatively, it may be credible to hold the operation codes in the common memory areas (IMAs) of the respective terminal control devices $5a_1$–$5a_{12}$. In such a case, a necessary time for the restoration of production line is remarkably shortened.

As was previously noted, the operation of the line control device 4a governing the twelve terminal control devices $5a_1$–$5a_{12}$ is true of the line control device 4b governing the seven terminal control devices $5b_1$–$5b_7$.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A control system for controlling a production facility having a plurality of automatic working apparatuses, installed in a plurality of work stations arranged in succession, respectively, for performing different types of specified operations on work units at said work stations to complete said work units which are assembled to products, said control system comprising:

first control means, provided for each of said automatic working apparatuses, for controlling each said automatic working apparatus independently from the other automatic working apparatuses to perform a specified operation on each said work unit, each said first control means being organized by at least a first data memory which has a common memory area shared in common by first data memories of the other first control means for the other automatic working apparatuses and an individual memory area exclusive thereto; and second control means, organized by at least a second data memory area sharing said common memory area, for storing operation data indicating at least types of said specified operations performed by said automatic working apparatuses in said second data memory area, said second control means being configured to govern said first control means for said working apparatuses and to transfer said data of said specified operations to said common memory area of said first data memories from said second data memory all together, whereby said first control means control said automatic working apparatuses to perform said different types of specified operations on a work unit, respectively, according to said data of said specified operations and to complete said work unit.

2. A control system for controlling a production facility as defined in claim 1, further comprising primary control means dominant over said second control means for providing for said second control means data on types of products and order of assembling said products based on which said second control means prepares said operation code data for said types of work units in said order of assembling.

3. A control system for controlling a production facility as defined in claim 2, wherein said second control means is loaded with data files containing operation code tables for various types of work units, respectively.

4. A control system for controlling a production facility as defined in claim 2, wherein each said first control means reads said operation code data, which is peculiar to said automatic working apparatus in association with said first control means, out of said common memory area and transfers said operation code data read out to said individual memory area of said first control means.

5. A control system for controlling a production facility as defined in claim 4, wherein said second control means is loaded with data files containing operation code tables for various types of work units, respectively.

* * * * *

UNITED STATES PATENT AND TRADEMARK OFFICE
CERTIFICATE OF CORRECTION

PATENT NO. : 5,699,242
DATED : December 16, 1997
INVENTOR(S) : Zenta TOGAWA, et al.

Page 1 of 3

It is certified that error appears in the above-identified patent and that said Letters Patent is hereby corrected as shown below:

Col. 4, line 13, change "$5a_1$-$5a_{12}$ and $5b_1$-$5b_7$" to --5a1-5a12 and --5b1-5b7--;
line 14, change "$6a_1$-$6a_{12}$" to --6a1-6a12--;
line 15, change "$6b_1$-$6b_7$" to --6b1-6b7--;
line 17, change "$6a_1$-$6a_{12}$ and $6b_1$-$6b_7$" to --6a1-6a12 and --6b1-6b7--;
line 21, change "$6a_1$-$6a_{12}$" to --6a1-6a12--;
line 22, change "$6b_1$-$6b_{12}$" to --6b1-6b12--;
line 24, change "$5a_1$-$5a_{12}$" to --5a1-5a12--;
line 26, change "$5b_1$-$5b_7$" to --5b1-5b7--;
line 29, change "$6a_1$-$6a_{12}$" to --6a1-6a12--;
line 34, change "$6b_1$-$6b_7$" to --6b1-6b7--.

Col. 5, line 10, after "8" insert --,--;
line 30, change "$3_1$" to --31--.

Col. 6, line 35, change "i.e." to ---i.e.--;
line 49, change "$5a_1$-$5a_{12}$" to --5a1-5a12--;
line 63, change "$5a_1$-$5a_{12}$" to --5a1-5a12--;

Col. 7, line 12, change "$5a_1$-$5a_{12}$" to --5a1-5a12--;
line 14, change "$6a_1$-$6a_{12}$" to --6a1-6a12--;
line 19, change "$6a_1$-$6a_{12}$" to --6a1-6a12--;
line 33, change "$5a_1$-$5a_{12}$" to --5a1-5a12--;
line 34, change "$5a_1$-$5a_{12}$" to --5a1-5a12--;
line 38, change "$5a_1$-$5a_{12}$" to --5a1-5a12--;
line 39, change "$6a_1$-$6a_{12}$" to --6a1-6a12--;
line 45, change "$5a_1$-$5a_{12}$" to --5a1-5a12--;
line 47, change "$5b_1$-$5b_7$" to --5b1-5b7--;

UNITED STATES PATENT AND TRADEMARK OFFICE
CERTIFICATE OF CORRECTION

PATENT NO. : 5,699,242

DATED : December 16, 1997

INVENTOR(S) : Zenta TOGAWA, et al.

It is certified that error appears in the above-identified patent and that said Letters Patent is hereby corrected as shown below:

Col. 9,  line 42, change "31" to --$3_1$--;
line 58, change "31" to --$3_1$--.

Col. 10, line 23, change "C(50-|i-m|)" to --$C_{(50-|i-m|)}$--;
line 24, change "C(i-m)" to --$C_{(i-m)}$--;
line 25, change "C(50-|i-m|)" to --$C_{(50-|i-m|)}$--;
and change "C(i-m)" to --$C_{(i-m)}$--;
line 50, change "$3_1$" to --$3_1$--;
line 60, change "$5a_1$-$5a_{12}$" to --$5a_1$-$5a_{12}$--;
line 64, change "$5a_1$-$5a_{12}$" to --$5a_1$-$5a_{12}$--;
line 67, change "$5a_1$-$5a_{12}$" to --$5a_1$-$5a_{12}$--.

Col. 11, line 11, change "$5a_1$-$5a_{12}$" to --$5a_1$-$5a_{12}$--;
line 18, change "$6a_1$-$6a_{12}$" to --$6a_1$-$6a_{12}$--;
line 23, change "$5a_1$-$5a_{12}$" to --$5a_1$-$5a_{12}$--;
lines 30 and 31, change "operation control" to --construction--;
line 32, change "$5b_1$-$5b_7$" to --$5b_1$-$5b_7$--;
line 33, change "$6b_1$-$6b_7$" to --$6b_1$-$6b_7$--;
line 34, change "$5a_1$-$5a_{12}$" to --$5a_1$-$5a_{12}$--;
line 35, change "$6a_1$-$6a_{12}$" to --$6a_1$-$6a_{12}$--;

Col. 12, line 25, change "$5a_1$-$5a_{12}$" to --$5a_1$-$5a_{12}$--;
line 26, change "$5a_1$-$5a_{12}$" to --$5a_1$-$5a_{12}$--;
line 27, change "$6a_1$-$6a_{12}$" to --$6a_1$-$6a_{12}$--;
line 31, change "$5a_1$-$5a_{12}$" to --$5a_1$-$5a_{12}$--;
line 40, change "$5a_1$-$5a_{12}$" to --$5a_1$-$5a_{12}$--;
line 44, change "$5a_1$-$5a_{12}$" to --$5a_1$-$5a_{12}$--;
line 45, "$5b_1$-$5b_7$" to --$5b_1$-$5b_7$--.

UNITED STATES PATENT AND TRADEMARK OFFICE
CERTIFICATE OF CORRECTION

PATENT NO. : 5,699,242
DATED : December 16, 1997
INVENTOR(S) : Zenta TOGAWA, et al.

It is certified that error appears in the above-identified patent and that said Letters Patent is hereby corrected as shown below:

line 53, change "$5b_1$-$5b_7$" to --5b1-5b7--.

Signed and Sealed this

Twenty-seventh Day of October, 1998

Attest:

BRUCE LEHMAN

*Attesting Officer*       *Commissioner of Patents and Trademarks*